(12) United States Patent
Han

(10) Patent No.: US 7,346,084 B1
(45) Date of Patent: Mar. 18, 2008

(54) DEVICE FOR GENERATING LOSSLESS PULSE ULTRAVIOLET LASER BEAM

(75) Inventor: Il-Ho Han, Bucheon (KR)

(73) Assignee: Jeil Mtech Co., Ltd., Seoul (KR)

( * ) Notice: Subject to any disclaimer, the term of this patent is extended or adjusted under 35 U.S.C. 154(b) by 0 days.

(21) Appl. No.: 11/562,838

(22) Filed: Nov. 22, 2006

(51) Int. Cl.
*H01S 3/30* (2006.01)
*H01S 3/10* (2006.01)
*H01S 3/13* (2006.01)

(52) U.S. Cl. .............................. 372/21; 372/6; 372/22; 372/30

(58) Field of Classification Search ................. 372/21, 372/22, 101, 30
See application file for complete search history.

Primary Examiner—Armando Rodriguez
(74) Attorney, Agent, or Firm—IPLA P.A.; James E. Bame

(57) ABSTRACT

There is provided a device for generating a lossless pulse ultraviolet laser beam of generating a laser beam having a desired wavelength by repeatedly rotating a laser beam generated by a pulse ytterbium fiber laser several times. The device includes a pulse ytterbium fiber laser generating and emitting a laser beam of a high-speed pulse form, a nonlinear harmonic crystal for modulating a wavelength of the laser beam into a desired wavelength, a lens for focusing the modulated beam, a reflecting mirror for transmitting a beam having a desired wavelength and reflecting a beam having an undesired wavelength, and a laser window having one AR-coated surface.

10 Claims, 1 Drawing Sheet

DEVICE FOR GENERATING LOSSLESS PULSE ULTRAVIOLET LASER BEAM

BACKGROUND OF THE INVENTION

1. Field of the Invention

The present invention relates to a device for generating a lossless pulse ultraviolet laser beam, and more particularly, to a device of generating an ultraviolet laser beam having a desired wavelength by allowing a laser beam generated using a pulse ytterbium fiber laser to pass through nonlinear harmonic crystals and then rotating the laser beam several times.

2. Description of the Related Art

A laser is the acronym of a "Light Amplification by Stimulated Emission of Radiation." A laser beam is a pure powerful light with high collimation and monochromaticity which is amplified by stimulated emission of radiation.

A laser beam is widely used in several applications. For example, a powerful laser beam is used to mark, drill, cut, and weld steel plates, solid jewelry, plastics, etc. in industrial fields, and exhibits excellent effects in LASIK surgery, dental surgery, disk surgery, gynecology surgery, etc. that are most widely known in a medical field.

In a munitions industry, a laser beam is also widely used to remove land mines and monitor the invasion of an enemy. In communication fields, the laser beam is used to transmit much information more quickly.

Particularly, an ultraviolet (UV) laser beam has an oscillation wavelength of 15 to 400 nm.

When a laser beam having a wavelength of 200 nm or less passes through the air, it is substantially absorbed into the air just at a few centimeters of the air layer. Thus, the wavelength range of the laser beam is called an ultraviolet range because it can be used only in a vacuum environment.

The wavelengths of the laser beam enable different tasks to be performed.

For example, a laser beam having a wavelength of 355 nm is used for marking glass, drilling via holes, prototyping, and manufacturing a light mask and a compact mask for a liquid crystal display (LCD) device, a plasma display panel (PDP) device, etc., and a laser beam having a wavelength of 266 nm or 213 nm is used for semiconductor lithography, an extreme ultraviolet interferometer, a confocal microscope, a substitution of an excimer laser, etc.

The UV laser beam may also be used to measure air pollution.

For example, an UV laser beam irradiated by an artificial satellite and an UV laser received by a ground observatory are compared with each other in order to measure the air pollution.

This is because various factors causing air pollution absorb the UV laser beams. Representative air pollution factors include nitrogen dioxide ($NO_2$) in a 450 nm wavelength, sulfurous acid gas ($SO_2$) in a 300 nm wavelength, ozone ($O_3$) in a 290 nm wavelength, etc.

Two conventional UV laser beam generating systems include an excimer laser system, and an Nd:YAG laser system in which a light emitted from an Nd:YAG laser is passed through a nonlinear harmonic crystal so that the wavelength of the light is converted.

The excimer laser system generates beams of several wavelengths including an XeF laser beam (oscillation wavelength: 351 nm), an XeCl laser beam (oscillation wavelength: 308 nm), a KrF laser beam (oscillation wavelength: 248 nm), a KrCl laser beam (oscillation wavelength: 222 nm), and an ArF laser beam (oscillation wavelength: 193 nm) by changing a medium for the excimer laser.

The Nd:YAG laser system obtains a desired wavelength by passing a laser beam having a 1064 nm wavelength oscillated in an Nd:YAG laser through a nonlinear harmonic crystal.

However, the excimer laser system requires different mediums to be used dependent on objects to be machined. In addition, a medium, poisonous gas, should be replaced, a laser mirror should be periodically cleaned and aligned, and system maintenance is costly.

The Nd:YAG laser system has a limitation in machining products because it emits the light beam of one constant wavelength of 1064 nm, and requires an appropriate nonlinear harmonic crystal for changing the wavelength of the laser beam.

In addition, the Nd:YAG laser system cannot obtain a desired wavelength when the crystal is positioned at an incorrect angle. Accordingly, the crystal should be aligned each time the crystal is periodically replaced. In addition, the laser mirror should be cleaned.

In addition to the inconveniences and high maintenance cost, such conventional UV laser exhibits low energy efficiency of about 2 to 3% and has poor beam quality.

Further, a great amount of an intermediately-processed or finally-output UV laser beam is lost when it is used in practice.

This is because laser beams having other wavelengths are emitted together with the UV laser beam even when only the UV laser beam is made to be emitted.

SUMMARY OF THE INVENTION

The present invention provides a device for generating an ultraviolet laser beam having a desired wavelength by rotating a laser beam generated by a pulse ytterbium fiber laser several times, thereby resulting in high energy efficiency since the laser beam is a lossless light, high beam quality, improved convenience, and low maintenance cost.

According to an aspect of the present invention, there is provided a device for generating a lossless pulse ultraviolet (UV) laser beam including a pulse ytterbium fiber laser for emitting a laser beam in a pulse form; a laser window for transmitting part of the laser beam emitted from the pulse ytterbium fiber laser and reflecting the other; a beam expander for reducing a diameter of a laser beam having a first wavelength passing through the laser window to increase a power density of the laser beam; a nonlinear harmonic crystal (LBO and SHG) for modulating the laser beam passing through the beam expander from the first wavelength to a second wavelength; a lens for focusing the laser beam having the second wavelength passing through the nonlinear harmonic crystal; a nonlinear harmonic crystal (LBO and THG) for modulating the laser beam from the second wavelength to a third wavelength; a combination wave splitter for reflecting the laser beam having the third wavelength that is an ultraviolet range of the laser beam passing through the nonlinear harmonic crystal and transmitting the laser beams having the first and second wavelengths; a reflecting mirror for reflecting the third wavelength laser beam reflected by the combination wave splitter; reflecting mirrors for reflecting the laser beam having the first and second wavelengths transmitted by the combination wave splitter to a fiber cable; fiber cable sets for transferring the reflected laser beams having the first and second wavelengths; reflecting mirrors for transmitting the laser beam having the first wavelength from the fiber cable sets and reflecting the laser beam having the second wavelength to the beam expander; a reflecting mirror for reflecting the laser beam having the first wavelength transmitted by the reflecting mirror to the window laser; and reflecting mirrors for reflecting part of the laser beam transmitted by the laser window to the fiber cable set.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
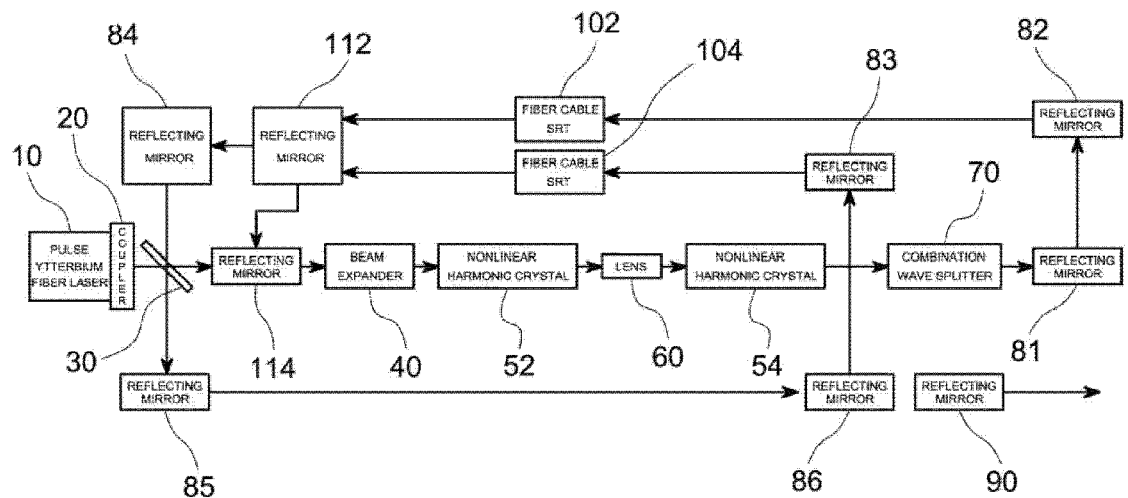
FIG. 1 illustrates a configuration of a device for generating a lossless pulse ultraviolet laser beam according to an embodiment of the present invention.

The present invention will now be described more fully hereinafter with reference to the accompanying drawings, in which preferred embodiments of the invention are shown. This invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the thicknesses of layers and regions are exaggerated for clarity.

Figure 2:
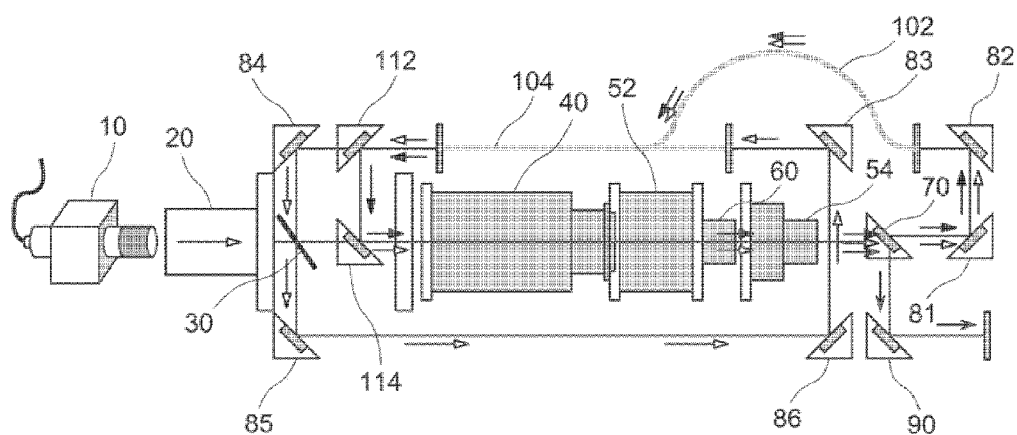
FIG. 2 illustrates a principle of generating the laser beam of FIG. 1.

FIG. 1 illustrates a configuration of a device for generating a lossless pulse ultraviolet laser beam according to an embodiment of the present invention, and FIG. 2 illustrates a principle of generating the laser beam of FIG. 1.

As shown in FIGS. 1 and 2, the device includes a Q-switched pulse ytterbium fiber laser 10, a coupler 20, a laser window 30, a beam expander 40, nonlinear harmonic crystals 52 and 54, a lens 60, a combination wave splitter 70, reflecting mirrors 81 to 86, a reflecting mirror 90 and fiber cable sets 102 and 104, and reflecting mirrors 112 and 114.

The Q-switched pulse ytterbium fiber laser 10 is used as a laser source, and two $LiB_3O_5$ crystals (LBO; Lithium Triborate) 52 and 54 are used as a light gain medium and a wavelength converting medium, respectively.

The pulse ytterbium fiber laser (e.g., YLP-1/100/20(A); a Q-switched ytterbium fiber laser using pulse modulation, 20 Watt, manufactured by IPG) 10 generates a laser beam in a pulse form, and includes a source unit for generating a laser beam and a head for focusing the laser beam into a 5 mm diameter and emitting the focused laser beam, both of them being connected to each other via an optical fiber.

The coupler 20 is coupled to the pulse ytterbium fiber laser 10 for fixing the laser beam.

The laser window 30 has one antireflection (AR)-coated surface for transmitting 95% of all wavelengths of the laser beam and reflecting the rest 5% of the wavelengths thereof.

The laser window 30 has a gap of about 0.28 mm to reflect and transmit an initial laser beam having a wavelength of 1064 nm generated by the pulse ytterbium fiber laser 10 and additionally reflect and transmit a returned 1064 nm laser beam.

The beam expander 40 is a reverse expander and serves to reduce a diameter of the laser beam emitted by the pulse ytterbium fiber laser 10, thereby increasing a power density of the laser beam.

Normally, a beam expander serves to expand small light. Beam expanders disposed reversely in front and rear directions enable the light to be focused with a smaller diameter.

The power density is increased so that the laser beam passes through the nonlinear harmonic crystals 52 and 54. The LBO crystal (Second Harmonic Generation; SHG) 52 and the LBO crystal (Third Harmonic Generation; THG) 54 have minimal pass power density of $50MW/cm^2$ or higher. Accordingly, when the power density of the laser beam before passing through the beam expander 40 is about $0.5MW/cm^2$, it is difficult for the laser beam to pass through the two crystals 52 and 54, and thus, the beam expander 40 focuses the laser beam by reducing the diameter of the laser beam to 1/40.

The first LBO crystal 52 converts the wavelength of the laser beam focused by the beam expander 40 from 1064 nm to 532 nm, and the second LBO crystal 54 converts it from 532 nm to 355 nm.

The first LBO crystal 52 ($LiB_3O_5$) has an asymmetrical structure exhibiting a nonlinear optical phenomenon when a powerful beam such as a laser beam passes through it, and thus, it is capable of modulating the wavelength of the laser beam.

The first LBO crystal 52 is a LBO crystal for SHG operation of type I having $\theta=90°$, $\pi=11.4°$, size=3×3×8 mm, and AR=1064/532 nm.

The diameter of the beam which is converted into the 532 nm beam by the nonlinear harmonic crystal (LBO) 52 is about 5 mm, but the 1064 nm beam is also output. As a result, a laser beam having a diameter of about 5.25 mm is obtained in the form of a Rugby ball with the wavelength increased by about 0.25 mm at a central portion thereof.

The lens 60 focuses the beam having the waveform of about 5.25 mm into about 2.625 mm.

In the present invention, the lens 60 is an M5× lens and includes a convex lens, a lens having one convex surface, and a concave lens, all of the three lenses being AR-coated.

Accordingly, the incident beam is focused on one point by the lens 60 and is incident into the second LBO crystal 54.

The second LBO 54 is an LBO crystal for THG operation of type II having $\theta=42.5°$, $\pi=90°$, size=3×3×8 mm, and AR=1064/532/355 nm.

Although the nonlinear harmonic crystals 32 and 34 have generated the 355 nm UV laser beam through SHG and THG based on the LBO crystal, the 266 nm or 213 nm UV laser beam may be generated through Fourth Harmonic Generation based on a $CsLiB_6O_{10}$ (CLBO; Cesium Lithium Triborate) crystal.

The combination wave splitter 70 includes a lens for reflecting 355 nm laser beam, and a lens for transmitting 1064 nm and 532 nm laser beams.

Among the split wavelength, the beam having the wavelength of 355 nm that is in the ultraviolet wavelength range is reflected by the reflecting mirror 90 to machine a target object.

The other split 1064 nm and 532 nm beams are reflected by the reflecting mirrors 81 and 82.

The reflected 1064 nm and 532 nm beams are incident into and transferred via the fiber cable sets 102 and 104.

The 1064 nm beam is transmitted by the reflecting mirrors 112 and 114, and the 532 nm beam is reflected by the reflecting mirrors 112 and 114 to the beam expander 40.

The transmitted 1064 nm beam is reflected by the reflecting mirror 84 to the laser window 30 by which 95% of the 1064 nm beam is transmitted and the other 5% is reflected.

The reflected 1064 nm beam of 5% is incident into the beam expander 40, meets the 1064 nm beam of 95% initially transmitted by the laser window 30, and focused back by the beam expander 40.

The transmitted 1064 nm beam of 95% meets the 1064 nm beam of 5% initially reflected by the laser window 30, is reflected by the reflecting mirrors 85, 86 and 83 to the cable set 104, and is reflected back by the reflecting mirrors 112 and 114, so that 5% of the 1064 nm beam is incident into the beam expander 40.

By doing so, a lossless UV laser beam is formed.

In this manner, the laser beam from the pulse ytterbium fiber laser 10 is passed through the laser window 30, focused by the beam expander 40, and passed through the nonlinear harmonic crystal 52, the lens 60 and the nonlinear harmonic crystal 54 to have a desired wavelength. The 355 nm beam is used to machine a target, and the 1064 nm and 532 nm beams not converted into the 355 nm beam are reflected by the reflecting mirrors 81 and 82 to the fiber cable sets 102 and 104. The 532 nm beam is reflected to the beam expanders 112 and 114, and the 1064 nm beam is directed back to the laser window 30.

The laser window 30 reflects 5% of the beam to the beam expander 40 and transmits the other 95% so as to make one round.

With the device for generating a lossless pulse UV laser beam according to an embodiment of the present invention described above, the laser beam is not substantially lost so that energy efficiency is significantly improved and beam quality is also improved compared to a conventional UV laser (typically, the efficiencies of an excimer laser, a $CO_2$ laser, and a YAG/semiconductor laser are 1 to 2%, 10 to 30%, and 20%, respectively).

Further, only the nonlinear harmonic crystals 52 and 54 need to be replaced one to three times per year according to an amount of use, thereby making maintenance convenient and maintenance cost low, compared to a conventional UV laser.

As described above, according to the present invention, a lossless laser beam is achieved, thereby increasing energy efficiency, obtaining high quality, and reducing maintenance cost.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A device for generating a lossless pulse ultraviolet laser beam comprising:
   a pulse ytterbium fiber laser for emitting a laser beam in a pulse form;
   a laser window for transmitting part of the laser beam emitted from the pulse ytterbium fiber laser and reflecting the rest of the laser beam;
   a beam expander for reducing a diameter of the laser beam having a first wavelength passing through the laser window to increase a power density of the laser beam;
   a nonlinear harmonic SHG (second harmonic generation) LBO crystal for modulating the laser beam passing through the beam expander from the first wavelength to a second wavelength;
   a lens for focusing the laser beam having the second wavelength passing through the nonlinear harmonic crystal;
   a nonlinear harmonic THG (third harmonic generation) LBO crystal for modulating the laser beam from the second wavelength to a third wavelength;
   a combination wave splitter for reflecting the laser beam having the third wavelength that is in an ultraviolet range of the laser beam passing through the nonlinear harmonic crystal and transmitting the laser beams having the first and second wavelengths;
   a reflecting mirror for reflecting the third wavelength laser beam reflected by the combination wave splitter;
   reflecting mirrors for reflecting the laser beam having the first and second wavelengths transmitted by the combination wave splitter to a fiber cable;
   fiber cable sets for transferring the reflected laser beams having the first and second wavelengths;
   reflecting mirrors for transmitting the laser beam having the first wavelength from the fiber cable sets and reflecting the laser beam having the second wavelength to the beam expander;
   a reflecting mirror for reflecting the laser beam having the first wavelength transmitted by the reflecting mirror to the window laser; and
   reflecting mirrors for reflecting part of the laser beam transmitted by the laser window to the fiber cable set.

2. The device of claim 1, wherein the pulse ytterbium fiber laser comprises a source for generating the laser beam, and a head for focusing and emitting the laser beam, the source and the head being connected to each other via an optical fiber.

3. The device of claim 1, wherein the laser window comprises one antireflection AR-coated surface for transmitting 95% of the laser beam and reflecting the other 5% thereof.

4. The device of claim 1, wherein the laser window has a gap of 0.28 mm.

5. The device of claim 3, wherein the laser window has a gap of 0.28 mm.

6. The device of claim 1, wherein the beam expander reduces the diameter of the laser beam in a ratio of 40:1.

7. The device of claim 1, wherein the lens is an M5× lens.

8. The device of claim 1, wherein the pulse ytterbium fiber laser comprises a coupler coupled thereto for fixing the laser beam.

9. The device of claim 1, wherein the first wavelength is 1064 nm, the second wavelength 532 nm, and the third wavelength 355 nm.

10. The device of claim 1, wherein the nonlinear harmonic crystals comprise Fourth Harmonic Generation CLBO crystals for generating laser beams having an wavelength of 266 nm or 213 nm.

* * * * *